United States Patent [19]

Makino

[11] Patent Number: 5,435,498
[45] Date of Patent: Jul. 25, 1995

[54] REEL LOCK DEVICE FOR A VIDEO TAPE CARTRIDGE

[75] Inventor: Masahiro Makino, Miyagi, Japan

[73] Assignee: Sony Corporation, Tokyo, Japan

[21] Appl. No.: 194,732

[22] Filed: Feb. 10, 1994

Related U.S. Application Data

[63] Continuation of Ser. No. 6,776, Jan. 21, 1993, abandoned.

[30] Foreign Application Priority Data

Jan. 27, 1992 [JP] Japan .................................. 4-011596

[51] Int. Cl.6 .......................................... G11B 23/087
[52] U.S. Cl. ............................ 242/343.2; 242/338.3; 360/132
[58] Field of Search ................. 242/197–200, 242/338.3, 338.1, 343.2, 338.2, 348, 343, 343.1, 326.1; 360/132; 354/275; 352/78 R

[56] References Cited

U.S. PATENT DOCUMENTS

| | | | |
|---|---|---|---|
| 4,553,717 | 11/1985 | Takagi | 242/338.3 |
| 4,631,619 | 12/1986 | Hashizume et al. | 242/338.3 |
| 4,650,136 | 3/1987 | Tsuruta | 242/338.3 |
| 4,703,384 | 10/1987 | Kawada et al. | 242/338.3 |
| 4,742,415 | 5/1988 | Oishi | 242/338.3 |
| 4,743,992 | 5/1988 | Komiyama et al. | 360/132 |
| 4,903,915 | 2/1990 | Iwahashi | 242/338.3 |

*Primary Examiner*—John Q. Nguyen
*Attorney, Agent, or Firm*—William S. Frommer; Alvin Sinderbrand

[57] ABSTRACT

A reel lock device for use in a video tape cartridge having upper and lower shells and reels rotatably disposed between the shells, includes reel lock levers rotatable on the lower shell to be engaged with the reels and disengaged therefrom. A release slider is slidably disposed on the lower shell and has two positions where the reel lock levers are engaged with the reels and disengaged therefrom, respectively. A stopper is secured on the lower shell and limiting sliding of the release slider in one direction. The release slider is formed with projections which extend therefrom to contact a rib projecting downwardly from the upper shell, the rib being narrower than the length of the projections.

3 Claims, 7 Drawing Sheets

5,435,498

REEL LOCK DEVICE FOR A VIDEO TAPE CARTRIDGE

This application is a continuation of application Ser. No. 08/006,776, filed Jan. 21, 1993, now abandoned.

BACKGROUND OF THE INVENTION

The present invention relates to a video tape cartridge, and more particularly to a reel lock device for restricting rotation of reels rotatably disposed in the video tape cartridge.

Reel lock devices for use in a video tape cartridge are well known in the art. One example of the reel lock devices includes reel lock levers for locking the reels and a release member for unlocking the reel lock levers. When the video tape cartridge is inserted into a video tape recorder and removed therefrom, the release member slides along a lower shell of a shell assembly of the video tape cartridge while abutting against an upper shell of the shell assembly. Upon sliding of the release member, there occurs a relatively large frictional resistance between the release member and the upper shell. The frictional resistance disturbs the sliding motion of the release member. This fails to perform a smooth reel locking/unlocking motion of the reel lock levers.

There is a demand to provide a reel lock device for use in a video tape cartridge, capable of smoothly locking and unlocking the reels by reducing a frictional resistance which occurs upon the insertion and removal of the video tape cartridge.

SUMMARY OF THE INVENTION

An object of the present invention is to provide a reel lock device for use in a video tape cartridge, which is improved in reducing a frictional resistance generated upon actuating the reel lock device in order to smoothly lock and unlock reels.

According to the present invention, there is provided a reel lock device for use in a video tape cartridge including a first shell, a second shell and reels rotatably disposed between the first and second shells, comprising:

reel lock levers movably disposed on the second shell to be engaged with the reels and disengaged therefrom;

a release slider slidable on the second shell and having a first position where the reel lock levers are engaged with the reels to lock a rotational movement of the reels and a second position where the reel lock levers are disengaged from the reels to allow the rotational movement of the reels;

a stopper disposed on the second shell and limiting sliding of the release slider on the second shell in one direction; and means for reducing a frictional resistance of the release slider against the first shell, the reducing means being provided on the release slider to contact the first shell.

DESCRIPTION OF THE PREFERRED EMBODIMENT

Figure 1:
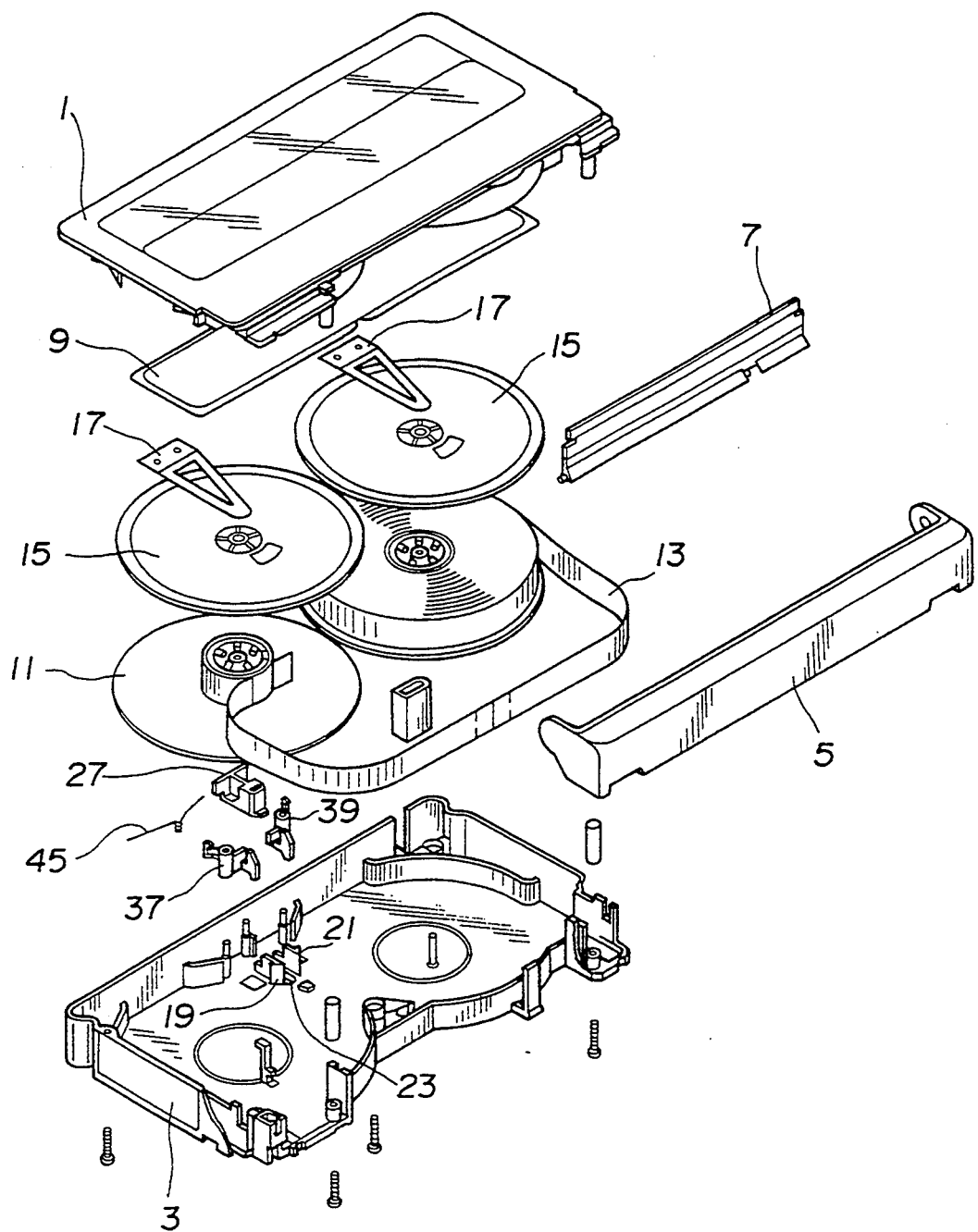
FIG. 1 is an exploded perspective view of a video tape cartridge including a preferred embodiment of a reel lock device according to the present invention.

Referring now to FIG. 1, there is shown a video tape cartridge including a preferred embodiment of a reel lock device according to the present invention. The video tape cartridge includes substantially rectangular upper and lower shells 1 and 3 as viewed in FIG. 1 and oblong end lids 5 and 7 disposed at opposite ends of the shells 1 and 3. A window panel 9 is disposed beneath the upper shell 1. Rotatably disposed on the lower shell 3 are a pair of reel hubs 11 about which a magnetic tape 13 is wound. A pair of disc-like reel flanges 15 are mounted on the reel hubs 11. The reel flanges 15 are urged against the reel hubs 11 by triangular springs 17 which are disposed thereabove.

As shown in FIG. 1, the lower shell 3 is formed integrally with opposite guides 19 and 21 in spaced relation and an opening 23 disposed therebetween. A release slider 27 is disposed between the guides 19 and 21 and in contact relation thereto to be slidable on the lower shell 3. The release slider 27 has a rectangular body portion and a tapered projection 29 extending forwardly or rightwardly as viewed in FIG. 2, from a lower front end of the body portion. A T-shaped tail 31 projects from the rear end of the body portion of the release slider 27 rearwardly or leftwardly as viewed in FIG. 2. The tapered projection 29 is engageable with a stopper 25 formed in front of the opening 23 and projecting upwardly from the lower shell 3 as viewed in FIG. 2. Projections or ridges 33 and 35 are formed on upper faces of the body portion and the T-shaped tail 31 of the release slider 27. The projections 33 and 35 contact a rib 2 extending orthogonally thereto and which depends from the upper shell 1, as seen in FIGS. 4 and 5, and such rib 2 is shown on FIG. 5 to have a thickness substantially smaller than the length of the projections 33 and 35 so as to have small areas of contact with the latter.

Figure 3:
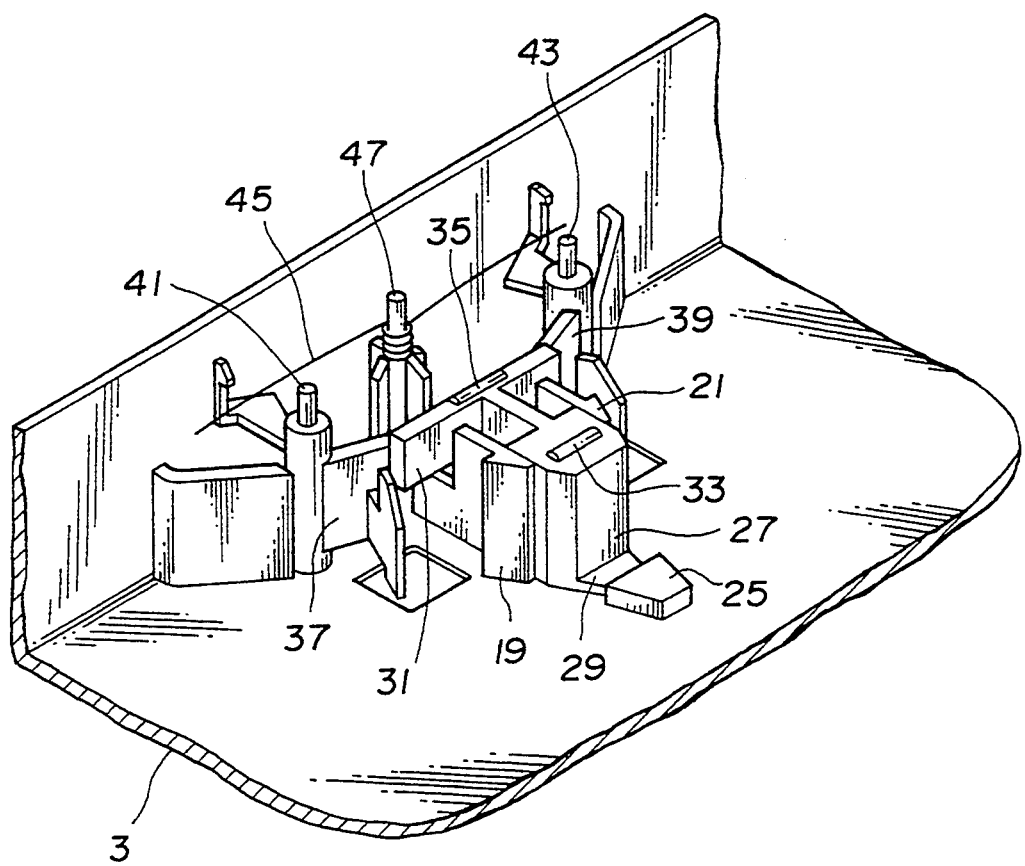
FIG. 3 is a perspective view of the reel lock device, in which the release slider is at its first position.

As shown in FIGS. 1 and 3, a pair of reel lock levers 37 and 39 are disposed adjacent the T-shaped tail 31 of the release slider 27. The reel lock levers 37 and 39 are rotatably supported on pivot pins 41 and 43, respectively, which are secured on the lower shell 3. A spring 45 is mounted on a pin 47 disposed between the pivot pins 41 and 43. The reel lock levers 37 and 39 are urged by the spring 45 to be rotatable about the pivot pins 41 and 43 in clockwise and counterclockwise directions, respectively. The reel lock levers 37 and 39 urge forwardly opposite ends of the T-shaped tail 31 of the release slider 27 so that the body portion of the release slider 27 is allowed to slide forwardly on the lower shell 3 in contact relation to the guides 19 and 21. Accordingly, the tapered projection 29 of the release slider 27 is close to the stopper 25. When the release slider 27 is in a first position as seen in FIG. 3, the reel lock levers 37 and 39 are engaged with the reels (not shown) so as to lock a rotational movement thereof.

Figure 4:
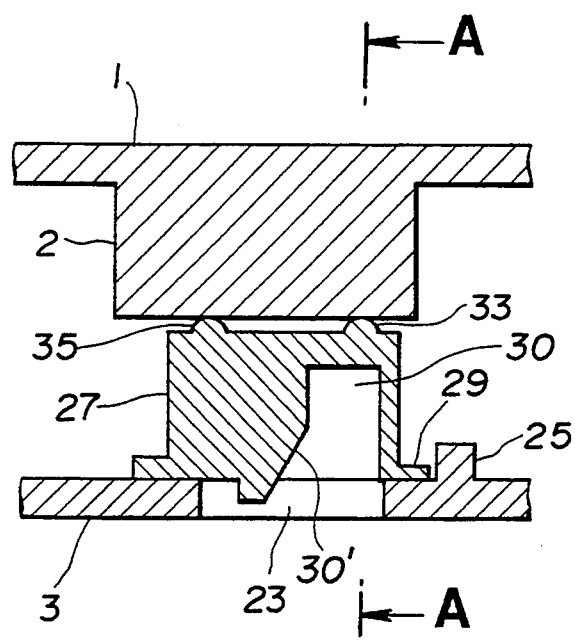
FIG. 4 is a cross section of the reel lock device.
Figure 5:
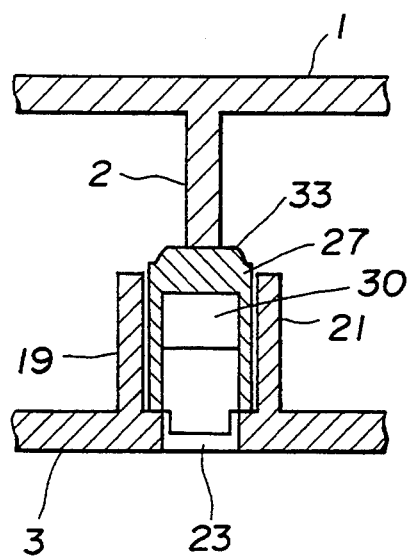
FIG. 5 is a cross section of the reel lock device taken along the line A—A of FIG. 4.

As seen in FIGS. 4 and 5, the release slider 27 is formed at its bottom side with a recess 30 opposed to the opening 23 of the lower shell 3. The release slider 27 has a slanting bottom face 301 extending from the recess 30 toward the opening 23. The slanting bottom face is engageable with a lock pin 51, as shown in FIGS. 6 and 8, which is mounted on a video tape recording apparatus (not shown).

Figure 6:
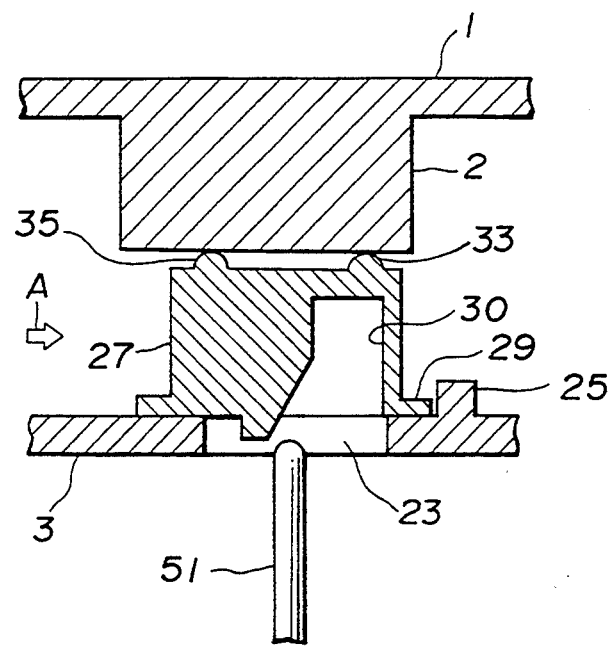
FIG. 6 is a cross section of the reel lock device, in which the release slider is disengaged from a lock pin.

When the video tape cartridge is not at operative position in the video tape recording apparatus and therefore the lock pin 51 is not engaged with the recess 30 as shown in FIG. 6, the release slider 27 is urged toward the stopper 25, i.e., in a direction as indicated by an arrow A in FIG. 6. A tip end of the lock pin 51 is placed in the opening 23 of the lower shell 3 but disengages the slanting bottom face 301 of the release slider 27.

Figure 8:
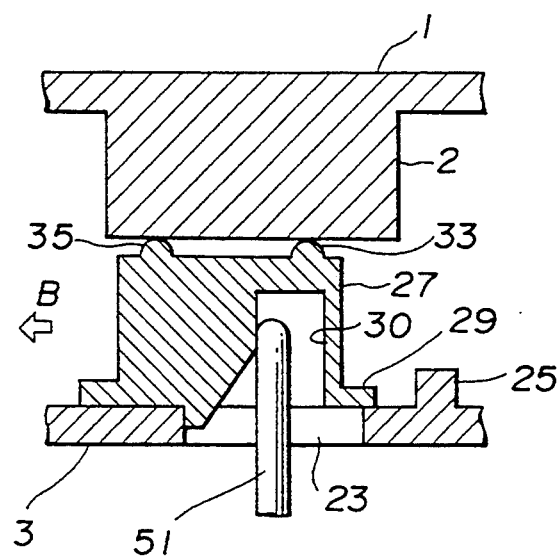
FIG. 8 is a cross section of the reel lock device, in which the release slider is engaged with the lock pin.
Figure 7:
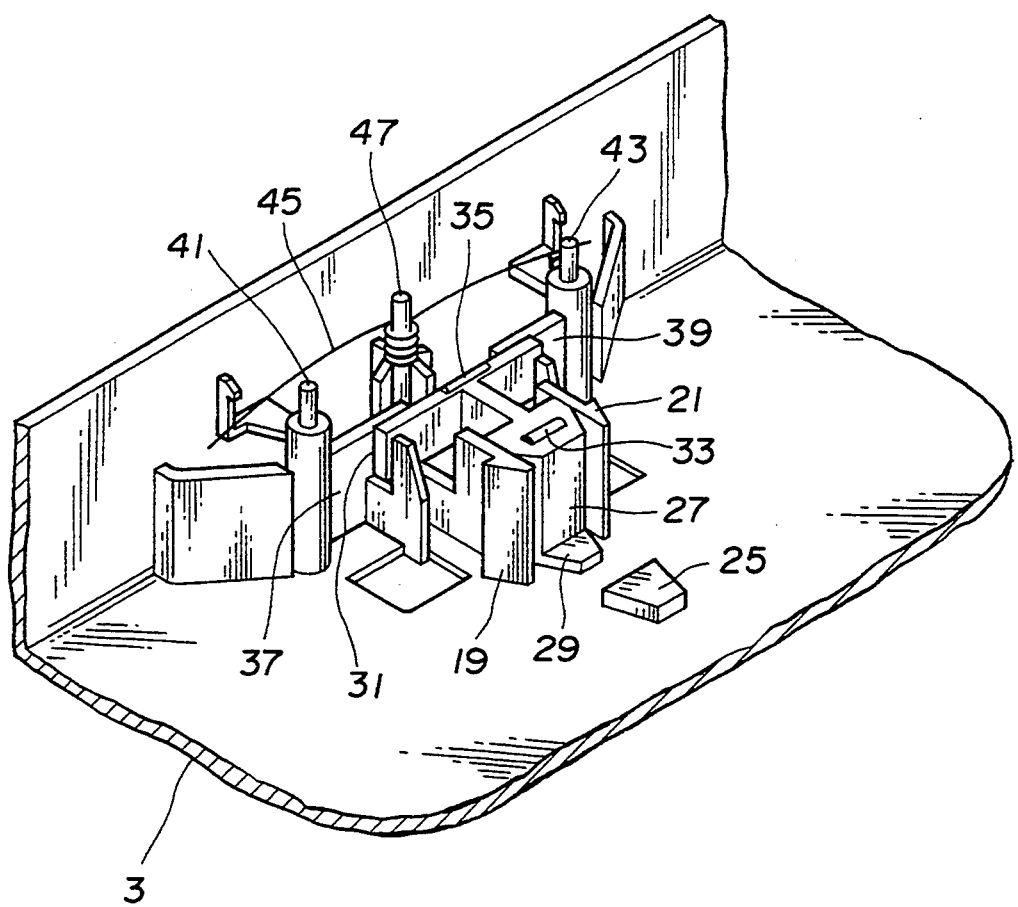
FIG. 7 is a perspective view of the reel lock device, in which the release slider is at its second position.

When the video tape cartridge is moved to the operative position in the video tape recording apparatus as shown in FIG. 8, the lock pin 51 projects upwardly from the opening 23 to engage the slanting bottom face 301 of the release slider 27. Then, the lock pin 51 ascends the slanting bottom face of the release slider 27 so that the release slider 27 is urged to slide along the lower shell 3 remote from the stopper 25, i.e., in a direction as indicated by an arrow B in FIG. 8. The release slider 27 is moved to a second position as seen in FIG. 7, and urges the reel lock levers 37 and 39 rearwardly. Owing to the urging motion of the release slider 27, the reel lock levers 37 and 39 are rotated about the pivot pins 41 and 43 in counterclockwise and clockwise directions, respectively. As a result, the reel lock levers 37 and 39 are in an unlocked position where they are disengaged from the reels. Thus, the reels are allowed to be rotatable.

When the video tape cartridge is removed from the video tape recording apparatus, the release slider 27 returns to the frontmost position by a force of the spring 45 and the reel lock levers 37 and 39 are engaged with the reels, as shown in FIG. 3.

The sliding motion of the release slider 27 is smoothly performed by the provision of the projections 33 and 35 on the release slider 27. This results from smaller frictional resistance of the projections 33 and 35 against a lower face of the rib 2 of the upper shell 1.

Figure 2:
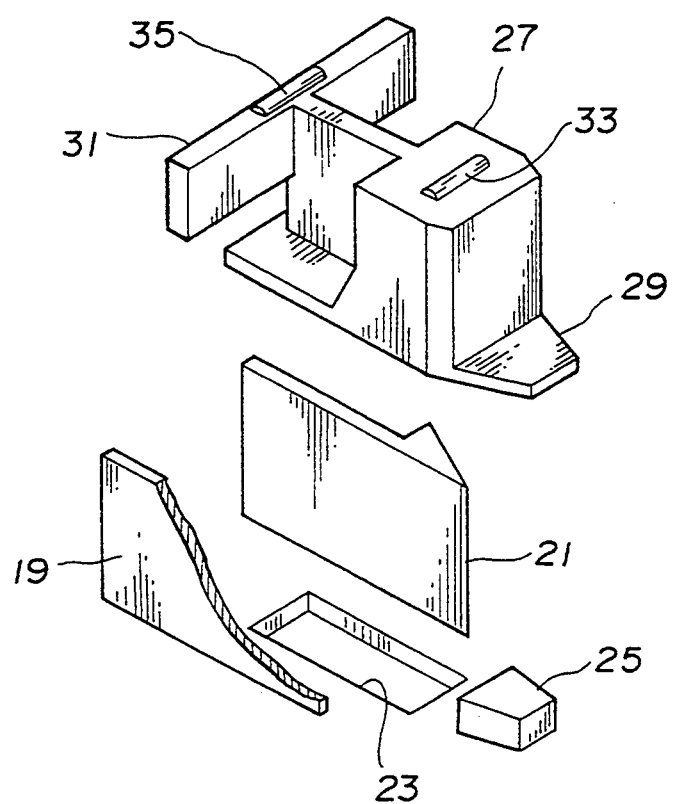
FIG. 2 is an enlarged perspective view of a release slider and a stopper which are parts of the reel lock device.
Figure 9:
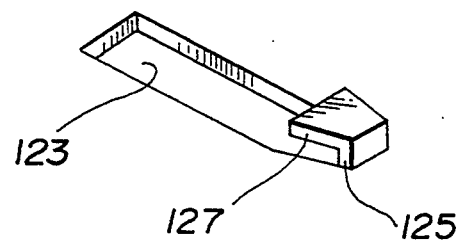
FIG. 9 is a perspective view of another embodiment of the stopper.
Figure 10:
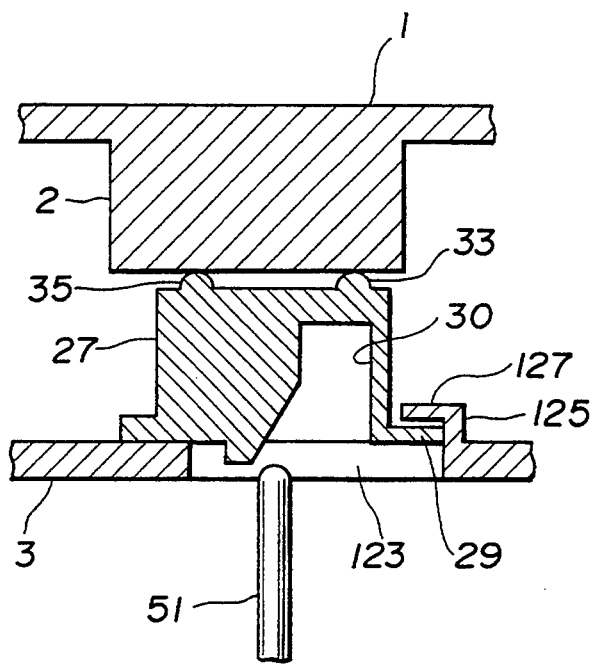
FIG. 10 is a cross section of the reel lock device including the stopper of FIG. 9, in which the release slider is disengaged from the lock pin.
Figure 11:
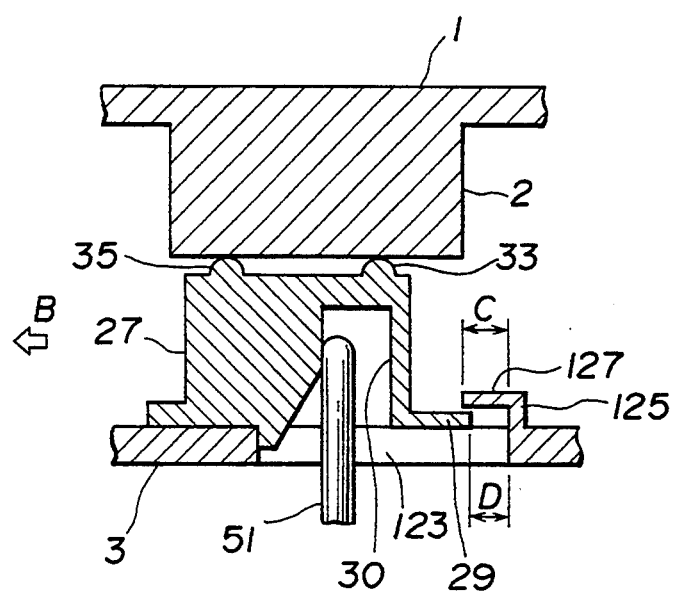
FIG. 11 is a cross section of the reel lock device including the stopper of FIG. 9, in which the release slider is engaged with the lock pin.

The stopper may be formed at a front portion of an opening 123, as shown in FIGS. 9-11, rather than in front of the opening 23, as shown in FIG. 2. In the embodiment of FIGS. 9-11, the stopper has an upright portion 125 extending upwardly from the lower shell 3 at the forward end of the opening 123 and a lateral portion 127 extending laterally, from a distal end of the upright portion 125 in the direction over the opening 123, that is, rearwardly as viewed in FIG. 9. The upright and lateral portions 125 and 127 cooperate with each other to define a groove with which the tapered projection 29 of the release slider 27 is engageable. The lateral portion 127 prevents substantially vertical displacement of the release slider 27 upon assembling the upper and lower shells 1 and 3, in cooperation with the tapered projection 29 of the release slider 27.

When the video tape cartridge is not at the operative position in the video tape recording apparatus and therefore the lock pin 51 is not inserted into the recess 30, the tapered projection 29 of the release slider 27 is engaged with the stopper as seen in FIG. 10. An upward movement of the tapered projection 29 is effectively prevented by the provision of the lateral portion 127 of the stopper.

When the video tape cartridge is at the operative position in the video tape recording apparatus and therefore the lock pin 51 is inserted into the recess 30 of the release slider 27, the tapered projection 29 of the release slider 27 is urged in a direction as indicated by an arrow B in FIG. 11. The tapered projection 29 is moved remote from the upright portion 125 of the stopper by a distance D as indicated in FIG. 11. The distance D is smaller than a length of the lateral portion of the stopper as indicated at C in FIG. 11. Accordingly, the front end portion of the opening 123 is always covered with the lateral portion 127 of the stopper so that the video tape cartridge is prevented from any external debris entering thereinside.

What is claimed is:

1. A tape cartridge comprising:
   a housing including a lower shell and an oppositely positioned upper shell assembled thereon;
   reels rotatably disposed within said housing between said lower and upper shells and having a tape wound thereon;
   reel lock levers pivoted within said housing for selectively engaging said reels and disengaging from said reels so as to effectively lock and unlock said reels, respectively;
   slider means for causing said reel lock levers to pivot and being slidable within said housing on said lower shell along a predetermined direction between a first position wherein said reel lock levers are biased to pivot so as to engage and lock said reels thereby preventing rotational movement of said reels and a second position wherein said reel lock levers are pushed by said slider means so as to be disengaged from said reels thereby allowing rotational movement of said reels, said slider means including at least two elongated members projecting upwardly from said slider means toward said upper shell and extending substantially parallel to each other in a direction substantially perpendicular to said predetermined direction, said elongated members being spaced from each other in said predetermined direction;
   a rib projecting downwardly from said upper shell and extending in said predetermined direction a distance at least equal to the sliding movement of said slider means, said rib including a lower edge surface slidably engaged by said elongated members and having a thickness in a direction perpendicular to said predetermined direction substantially smaller than the length of any of said elongated members so as to have relatively small areas of contact therewith, whereby said rib and elongated members form means for reducing frictional resistance between said upper shell and said slider means as said slider means slides between said positions; and means for preventing said slider means from sliding along said predetermined direction beyond a predetermined location.

2. A tape cartridge according to claim 1, wherein said slider means has a recess therein opening towards said lower shell and having a slanting surface, and said lower shell has an opening communicating with said recess of the slider means and through which a lock release pin can thrust upwardly against said slanting surface for urging said slider means to said second position while said means for reducing frictional resistance between said upper shell and said slider means absorbs the thrust of the lock release pin.

3. A tape cartridge according to claim 2, wherein said means for preventing sliding of said slider means beyond said predetermined location includes a stopper located on an inner surface of said lower shell adjacent said opening of the latter, said stopper defining a groove opening toward said slider means, and a projection extending from an end of said slider means over said opening for insertion into said groove and abutting against said stopper when said slider means attains said predetermined location, said groove having a length such that at least a portion of said projection on the slider means remains in said groove as said slider means moves between said first and second positions, said groove holding said slider means on said lower shell prior to the assembly of said upper shell thereon.

* * * * *